United States Patent [19]

Gray

[11] Patent Number: 5,372,653
[45] Date of Patent: Dec. 13, 1994

[54] CLEANING OF FILTERS

[75] Inventor: Gary E. G. Gray, Westwood Heath, United Kingdom

[73] Assignee: Courtaulds Fibres (Holdings) Limited, London, United Kingdom

[21] Appl. No.: 69,039

[22] Filed: May 28, 1993

[51] Int. Cl.⁵ .................. B08B 3/10; B08B 3/12; B08B 5/04; B01D 24/46

[52] U.S. Cl. .................. 134/26; 134/19; 134/20; 134/21; 134/1; 210/408; 210/410; 210/769; 210/771; 210/791

[58] Field of Search .......... 134/20, 21, 26, 19, 134/1; 210/408, 410, 769, 771, 791

[56] References Cited

U.S. PATENT DOCUMENTS 5,240,613 8/1993 Tsuchitani et al. ............ 210/791

FOREIGN PATENT DOCUMENTS 1044312 9/1983 U.S.S.R. ..................... 210/791

Primary Examiner—Richard O. Dean
Assistant Examiner—Zeinab El-Arini
Attorney, Agent, or Firm—Davis Hoxie Faithfull & Hapgood

[57] ABSTRACT

A method of cleaning metal filters of a solvent spun fibre production plant. The method comprises the step of (a) dissolving dope from the filters using a hot solvent for the dope, (b) washing the solvent from the filters using hot water, (c) pyrolysing remnants of dope or solvent in the filters, (d) ultrasonically washing the pyrolysed particles from the filters, (e) reheating the filters to dislodge pyrolysed particles, (f) ultrasonically rewashing the filters and (g) drying the filters.

13 Claims, 2 Drawing Sheets

CLEANING OF FILTERS

BACKGROUND OF THE INVENTION

This invention relates to filters for use in chemical processes and in particular to the methods of cleaning filters used for filtering dope in a solvent spun fibre manufacturing process, and to apparatus for cleaning such filters.

In the manufacture of solvent spun fibres such as, for example, Tencel (Trade Mark of Courtaulds Fibres Limited) cellulose fibre, a dope comprising woodpulp dissolved in an aqueous solution of amine oxide, is pumped under pressure through a series of filters to a plurality of spinnerette heads. The jets of each spinnerette head are typically 80 microns or less. Therefore the filtration of the dope is extremely important in order to avoid blockages of any of the spinnerette jets.

Modern plants, such as that installed by Courtaulds Fibers Inc at Mobile, Ala., USA are designed to produce many hundreds of tonnes of fibre on a continuous basis. The flow of dope to the spinnerette jets cannot be disrupted or varied at all without disastrous consequences. It is therefore extremely important that meticulously clean filter are used and that the process for cleaning the filters is as thorough as possible.

An object of the present invention is to provide a method of cleaning filters of a solvent-spun fibre manufacturing plant thoroughly and apparatus for carrying out the method.

SUMMARY OF THE INVENTION

According to one aspect of the invention there is provided a method of cleaning dope filters of a solvent-spun fibre manufacturing plant, the method comprising the steps of:

(a) assembling the filters to be cleaned in a vessel and flowing hot solvent for the dope through the filters thereby to dissolve dope from the filters and wash the filters, (b) washing the filters with hot demineralised water to wash solvent from the filters, (c) heating the filters under vacuum conditions to a temperature sufficient to carbonise any remnants of dope or solvent in the filters, (d) ultrasonically washing the filters in hot demineralised water to remove carbonised particles from the filters, and (e) drying the filters.

In a further aspect of the invention after step (d) the filters are placed in an oven, reheated to a predetermined temperature and allowed to cool and thereby dislodge any carbonised particles which may be present in the filters, and are ultrasonically washed in demineralised water to wash out any carbonised particles which are dislodged by the reheating step.

In the case where the dope is an aqueous solution of cellulose and amine oxide, the solvent used in step (a) is an aqueous solution of amine oxide heated to a temperature in the range of 100° C. to 120° C.

Preferably the solvent is caused to flow around the filters, and is caused to flow in a first direction through the filter. If desired the solvent may be caused to flow through the filters in the reverse direction to that of the first direction.

According to a further aspect of the invention there is provided apparatus for carrying out the method of cleaning dope filters of a solvent-spun fibre manufacturing plant the apparatus comprising a wash vessel in which the filters to be cleaned are mounted, means for selectively flowing solvent through the filters in the vessel, means for washing the filters with demineralised water, an evacuable oven for receiving and heating the filters under vacuum conditions thereby to carbonise any remnants of dope in the filters without combustion, an ultrasonic water bath for washing the filters, and drying means for drying the filters.

The apparatus may further comprise heating means for reheating the filters to dislodge carbonised particles.

BRIEF DESCRIPTION OF THE DRAWINGS

An embodiment of the present invention will now be described, by way of an example only, with reference to the accompanying drawings in which.

DETAILED DESCRIPTION

Figure 2:
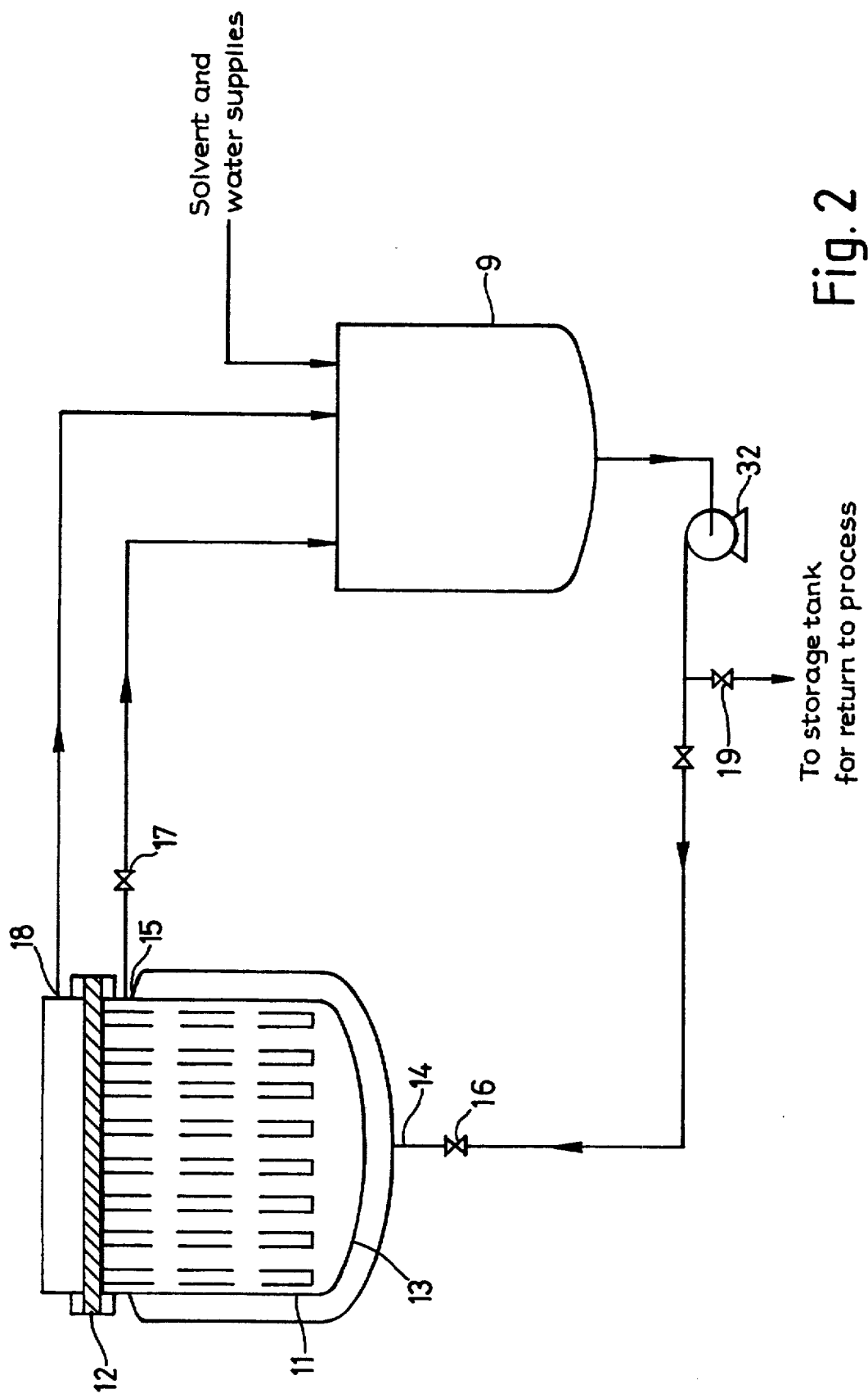
FIG. 2 shows schematically, one apparatus constructed in accordance with the present invention for carrying out the washing step of the method of the present invention.

Referring to FIG. 2 each filter 10 to be cleaned comprises a bundle of tubular filter elements 11 which are open at one end and closed at the other end. The tubular elements 11 have a cylindrical wall formed by two layers of sintered stainless steel fibre mats with an effective pore size that will filter out particles of 20µ size. The elements 11 are mounted in a header plate 12 which, in use in the production plant, is mounted in a sealed filter vessel (not shown). Dope to be filtered flows through the cylindrical walls of the elements 11 into the bore of the elements 11 and leaves by the open end of the elements 11. Hence when the filters 11 become blocked and require cleaning they are covered with dope which, when cooled, congeals on the outside and inside of the elements 11.

Prior to being removed from the filter vessel a proportion of the dope (around 70%) is blown down from the filters using an inert gas such as nitrogen. The filter is then removed for cleaning.

Figure 1:
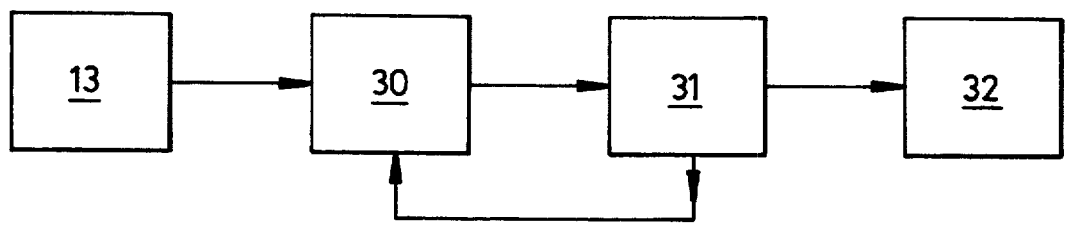
FIG. 1 shows schematically, in block diagram form, apparatus for washing and cleaning the main filters of a solvent-spun-fibre manufacturing plant in accordance with the method of the present invention.

Referring to FIG. 1, the filter elements 11 to be cleaned are first washed (step 13) to remove the bulk of dope. The filter elements are then heated in an oven 30 to pyrolyse, and thereby carbonise, remnants of dope in the filters, and the carbonised particles are washed (step 31) from the filters by placing the filter elements in an ultrasonic bath of hot demineralised water.

The filter elements 11 are then sprayed with high pressure demineralised water to dislodge carbonised particles. The ultrasonic washing step and the high pressure water spraying step are repeated a number of times and each filter element is dried and weighed.

The filter elements are re-heated in the oven 30, not to effect pyrolysis, but to dislodge further carbonised particles. The filter elements are then re-washed in the ultrasonic bath (step 31) and dried in a conventional oven 32. The reheating step 30, and the washing step 31 and drying step 32 may be repeated a number of times.

Figure 3:
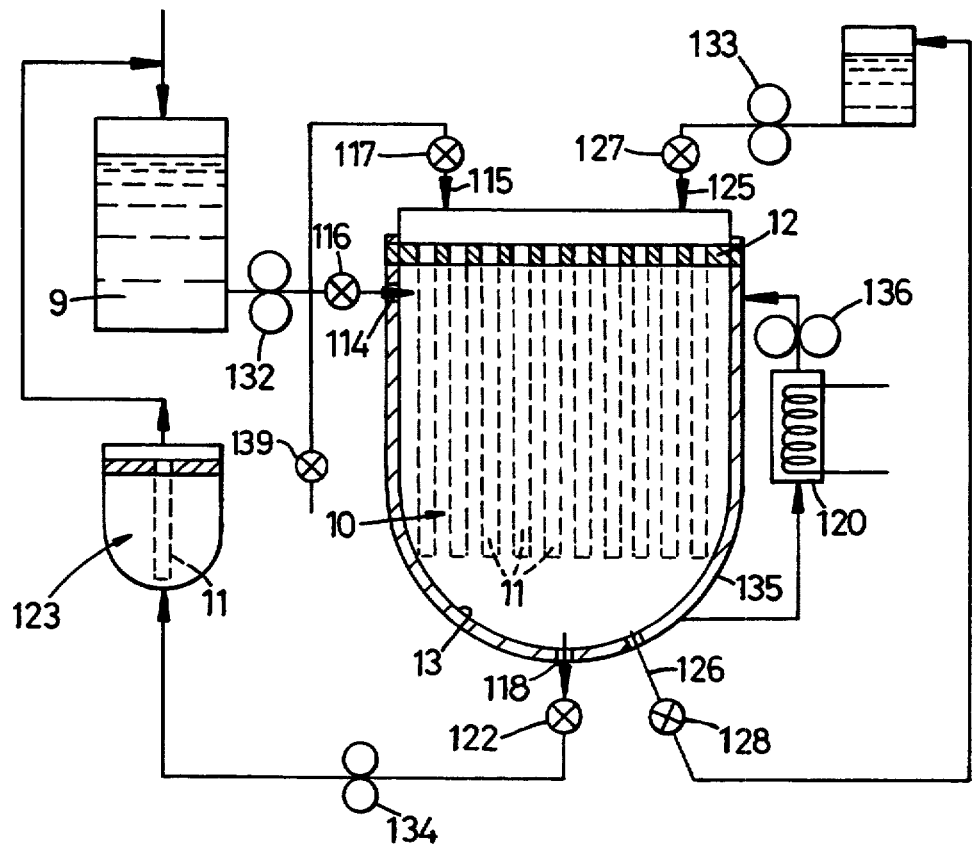
FIG. 3 shows schematically, a second apparatus constructed in accordance with the present invention for carrying out the washing step of the method of the present invention.

FIGS. 2 and 3 show more detail of two versions of a wash vessel 13 and the ancillary services used for washing the filter elements.

Referring in particular to FIG. 2, a bundle of blocked filters to be cleaned, still mounted in their respective header plate 12, are removed from the fibre production plant and are mounted in a sealable heated wash vessel 13.

The sump vessel 9 is supplied with an aqueous solution (approximately 78% by weight) of hot (approximately 80° C.) amine oxide from a storage tank (not shown). The solution is diluted down to approximately 76% by weight with hot demineralised water.

This cleaning liquor solution is circulated by pump 32 into a wash vessel 13 through inlet 14 at the bottom of vessel 13 around the elements 11 and leaves the vessel through four outlets 15 (only one of which is shown) and valve 17 back to the sump tank 9.

Whilst this cleaning liquor is being circulated by pump 32, the liquor is heated to approximately 110° C. by hot water heated jackets positioned around the vessel 13 and tank 9 and the pipework. Once the cleaning liquor has reached the operating temperature (110° C.) the circulation is continued for about 2 hours. The water jacket temperature is then reduced to allow the liquor to cool to about 70° C. The cleaning liquor is then pumped from the sump tank 9, to the storage tank (not shown) by pump 32 for reuse.

Fresh amine oxide is then introduced into the sump tank 9 and diluted as described above. This fresh cleaning liquor solution is circulated by pump 32 through inlet 14 of the wash vessel 13 and leaves the vessel through the outlet 15 via the valve 17. Again the solution is heated to 110° C. by the water jacket around the vessels 13, tank 9 and the pipework. Once the cleaning liquor has reached the operating temperature the valve 17 is closed forcing the cleaning liquor to flow through the filter elements 11 and back to the tank 9 through the outlets 18. This circulation procedure continues for about 3 hours after which the water jacket temperature is reduced to allow the cleaning liquor to cool to about 70° C. Once cooled the liquor is pumped by pump 32 via valve 19 back to the storage tank 9 for reuse.

Finally a third batch of hot amine solution is introduced into the sump tank 9 and diluted as before. Again the liquor is circulated by pump 32 through the vessel 13 through inlet 14 and outlets 15 and back to the sump tank 9. Again the liquor is heated to 110° C. by the water jacketing. The liquor is held at this temperature and circulated for 3 hours. The liquor is then cooled to 70° C. and returned to the storage tank. Once the third wash is completed the vessel 13 is opened and the elements 11 are removed.

The elements 11 can be washed with hot demineralised water in the vessel 13 or after they have been removed from the vessel to wash off the amine oxide.

In a further variation of the above described washing cycle, the wash vessel 13 is provided with two valved inlet 114, 115 (see FIG. 3) and a valved outlet 118. The cleaning liquor, diluted as described above, is circulated by the pump 132 to a selected one of the inlets 114 or 115 as described below.

Inlet 114 is connected to the interior of the vessel 13 to one side of the header plate 12 via valve 116. The inlet 114 allows hot amine oxide to be pumped by pump 132 over the outside of the elements 11 to dissolve off the dope which collects on the elements 11 and the liquor is pumped from the vessel 13 back to the tank 109 through the outlet 118 and valve 122 as described above.

The inlet 115 is connected via valve 116 to the other side of the header plate 12 and allows hot amine oxide to be pumped by pump 132 through the elements from the inside to the outside and out of the outlet 118 back to the sump tank 9. This allows the dope which collects on the inside of the filter 11 to be dissolved off and flushed through the filter media of the filters 11 by the hot amine oxide.

The amine oxide is heated to a temperature of 110° C. by means of hot water jackets heated by a heat exchanger 20 as described above.

The amine oxide which is pumped from the vessel 13 back to the storage tank by pump 134, may be filtered by a filter 123 which comprises one tubular element of identical construction to that of the elements 11 to be cleaned. Accordingly, when filter 123 becomes blocked it can be cleaned in the same way as the elements 11.

The vessel 13 may be provided with a pumped supply of hot demineralised water by means of a pump 133 and valved inlets and outlets 125 and 126 respectively. The inlet 125 is connected to the same side of the header plate as the inlet 115 so that hot water pumped into inlet 125 flows through the filter elements 11 from the inside to the outside.

The sequence of operation of the valves 116, 117, 122, 127 and 122 is as follows. First valves 117, 127 and 128 are closed and valves 116 and 122 are opened so that amine oxide fills the vessel 13 and dissolves away the dope that congeals on the outside of the elements 11. Circulation of the hot amine oxide is carried out for about 2hours. The valves 117 and 122 are then opened to allow hot amine oxide to flow from the inside of the elements through the gauze meshes and thereby dissolve the dope in the bores and through the walls of the elements 11. Circulation of hot amine oxide is carried out for about 3 hours. The valve 116 is then closed so that the whole flow of amine oxide is pumped through the elements 11, and circulation of hot amine oxide, is carried out for approximately 3 hours.

Supply of amine oxide to the vessel 13 is then stopped by stopping pump 32 and closing off the valves 116 and 117. Valve 122 is then closed off and the contents of sump tank 9 is pumped by pump 132 back to a storage tank (not shown) via valve 139.

The elements 11 are then washed with hot demineralised water (100° C.) by opening valves 127 and 128 at the inlet 125, and outlet 126 of the water supply and pumping the water through the vessel 13 by means of pump 133. The valves 127 and 128 are then closed, the pump 133 stopped and the vessel 13 opened to remove the bundle of elements 11.

Referring to FIG. 1 the elements 11 are removed from the header plate 12 of the apparatus shown in FIGS. 2 or 3 and placed on a carrier, and the carrier is placed inside an electrically heated vacuum oven 30.

The oven 30 is first evacuated to a pressure of approximately 26 inches gauge (i.e. 4 inches absolute) to prevent oxidation and combustion of residue of dope or amine oxide which may still be present in the elements 11. The oven 30 is then heated to a temperature of 400° C. to 415° C. to carbonise any residue. The elements 11 are pyrolysed for about 4 to 5 hours. Air is admmited to the oven and the pressure is adjusted to about 13 to 20 inches gauge of mercury to cause oxidation and controlled cumbustion of carbonaceous particles.

After pyrolysis in the oven 30 the elements 11 are removed and placed in an ultrasonic cleaning bath 31 which is supplied with hot demineralised water, heated to a temperature of 80° C. to 100° C. The ultrasonic bath shakes loose any carbonised particles in the filter elements 11. The filter elements 11 are also washed with high pressure water jets to dislodge carbonised particles. The high pressure water wash and ultrasonic water wash may be repeated a number of times if desired.

The elements 11 are removed from the ultrasonic bath 31 and returned to the vacuum oven 30 (they could be heated in a conventional oven) where they are heated to about 120° C. 4 to 5 hours at atmospheric pressure. This step serves to dislodge further particles which remain in the elements after the pyrolysis and ultrasonic wash cycles. The main function of this reheating step is not to achieve further pyrolysis. Furthermore there is little or no risk of combustion of any remaining remnants of dope so the heating need not be carried out under evacuated conditions. It has been found that this reheating step dislodges as much as 10 grams of debris for each filter and, in relative terms, this is a significant amount. The filter elements 11 are removed from the oven 30 and returned to the ultrasonic water bath 31 and washed in hot water to wash away debris released in the reheat cycle.

The washed filters 11 are then dried, either in the same oven as used for the pyrolysis, or a conventional oven 32 at atmospheric pressure.

The cleaned filter elements are removed from the drying oven 32 weighed and compared to their original newly manufactured uncontaminated weight to ensure all debris has been removed. If weighing of the elements 11 shows that debris remains in the filter element the reheat, ultrasonic wash, high pressure wash, and drying cycle may be repeated a number of times until all debris is removed. The completely cleaned filter elements 11 are then carefully stored ready for reassembly into a header plate 12 for reinstallation in the dope supply line of the fibre manufacturing plant.

I claim:

1. A method of cleaning dope filters of a solvent-spun fibre manufacturing plant, the method comprising the steps of:
    (a) assembling the filters to be cleaned in a vessel and flowing hot solvent for the dope through the filters thereby to dissolve dope from the filters and wash the filters;
    (b) washing the filters with hot demineralized water to wash solvent from the filters;
    (c) heating the filters under vacuum conditions to a temperature sufficient to carbonize any remnants of dope or solvent in the filters;
    (d) ultrasonically washing the filters in hot demineralized water to remove carbonized particles from the filters; and
    (e) drying the filters.

2. A method according to claim 1 wherein after step (d) the filters are placed in an oven, reheated to a temperature and allowed to cool and thereby dislodge any carbonized particles which may be present in the filters, and are ultrasonically washed in demineralized water to wash out any carbonised particles which are dislodged by the reheating step.

3. A method according to claim 2 wherein the filters are reheated to a temperature of 120° C. in air at atmospheric pressure.

4. A method according to claim 2 wherein the water used to wash the carbonized particles from the filters after the reheating step is heated to a temperature in the range of 80° C. to 100° C.

5. A method according to claim 1 wherein the dope is an aqueous solution of cellulose and amine oxide and the solvent used in step (a) is an aqueous solution of amine oxide heated to a temperature in the range of 100° C. to 120° C.

6. A method according to claim 1 wherein the solvent is caused to flow around the filters, and is caused to flow in a first direction through the filter.

7. A method according to claim 6 wherein the solvent is caused to flow through the filters in the reverse direction to that of the first direction.

8. A method according to claim 1 wherein the water used in step (b) is heated to a temperature in the range 100° C. to 120° C.

9. A method according to claim 1 wherein the filters are heated in step (c) to a temperature in the range of 400° C. to 415° C. in air at a pressure of 13 to 26 inches (guage) of mercury.

10. A method according to claim 9 wherein the filters are first heated to a temperature of 400° C. to 415° C. in an oven evacuated to a pressure of 26 inches (gauge) of mercury, and the filters are then heated to a temperature of 400° C. to 415° C. in air at a pressure of 13 to 20 inches (gauge) of mercury.

11. Apparatus for cleaning dope filters comprising a wash vessel, means for mounting the filters to be cleaned in said wash vessel, means for passing a hot solvent for the dope through the filters in said wash vessel, means for washing the filters with hot demineralized water, an evacuable oven for receiving and heating the washed filters under vacuum, an ultrasonic water bath for receiving filters from said oven, and a drying means for drying filters taken from said ultrasonic water bath.

12. The apparatus claimed in claim 11 and further including heating means for reheating the filters after they have been cleaned in said ultrasonic water bath.

13. The apparatus claimed in claim 11 wherein the dryer is an oven.

* * * * *